United States Patent
Bodog et al.

(10) Patent No.: US 9,167,450 B2
(45) Date of Patent: Oct. 20, 2015

(54) EXCLUDING ROAMING USERS FROM AREA BASED MDT DATA TRANSMISSION

(75) Inventors: Gyula Bodog, Budapest (HU); Malgorzata Tomala, Nowe Miasto nad Pilica (PL)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 14/007,197

(22) PCT Filed: Apr. 4, 2011

(86) PCT No.: PCT/EP2011/055189
§ 371 (c)(1),
(2), (4) Date: Sep. 24, 2013

(87) PCT Pub. No.: WO2012/136242
PCT Pub. Date: Oct. 11, 2012

(65) Prior Publication Data
US 2014/0024366 A1    Jan. 23, 2014

(51) Int. Cl.
*H04W 4/00* (2009.01)
*H04W 24/02* (2009.01)
*H04W 24/08* (2009.01)
(Continued)

(52) U.S. Cl.
CPC ............. *H04W 24/02* (2013.01); *H04W 24/08* (2013.01); *H04W 8/12* (2013.01); *H04W 88/06* (2013.01)

(58) Field of Classification Search
CPC ..... H04W 24/00; H04W 24/02; H04W 24/06; H04W 24/08; H04W 48/00; H04W 52/00; H04W 64/00; H04W 8/12

USPC ............ 455/403, 414.1, 432.3, 435.1, 435.2, 455/434, 433, 450, 452.1, 436, 432.1
See application file for complete search history.

(56) References Cited

U.S. PATENT DOCUMENTS

| | | | |
|---|---|---|---|
| 2007/0218862 A1 | 9/2007 | Tatman et al. | |
| 2007/0218893 A1 | 9/2007 | Tatman et al. | |
| 2008/0039078 A1* | 2/2008 | Xu et al. | 455/432.1 |

(Continued)

FOREIGN PATENT DOCUMENTS

| | | |
|---|---|---|
| DE | 102009010685 B3 | 9/2010 |
| JP | 2014-505417 A | 2/2014 |

(Continued)

OTHER PUBLICATIONS

International Search Report and Written Opinion dated Dec. 20, 2011 corresponding to International Patent Application No. PCT/EP2011/055189.

(Continued)

*Primary Examiner* — Jean Gelin
(74) *Attorney, Agent, or Firm* — Squire Patton Boggs (US) LLP

(57) ABSTRACT

It is provided an apparatus, comprising base station means adapted to provide a base station functionality of a visited mobile network; selecting means adapted to select a user equipment, which is operably connected to the base station means, to report a result of a predefined measurement to the apparatus, wherein the selecting means is adapted to select the user equipment only if a roaming information of the user equipment received from a mobility management entity by which mobility of the user equipment is controlled indicates that a user of the user equipment is subscribed to one of one or more predefined mobile networks.

18 Claims, 2 Drawing Sheets

(51) Int. Cl.
*H04W 8/12* (2009.01)
*H04W 88/06* (2009.01)

(56) References Cited

U.S. PATENT DOCUMENTS

| | | | |
|---|---|---|---|
| 2009/0047947 A1* | 2/2009 | Giaretta et al. | 455/432.1 |
| 2009/0143065 A1* | 6/2009 | Mattila | 455/423 |
| 2011/0286356 A1* | 11/2011 | Tenny et al. | 370/254 |
| 2012/0108199 A1* | 5/2012 | Wang et al. | 455/405 |
| 2012/0184277 A1* | 7/2012 | Hiltunen et al. | 455/437 |
| 2012/0309431 A1* | 12/2012 | Bodog | 455/456.6 |
| 2013/0194915 A1* | 8/2013 | Wegmann et al. | 370/228 |
| 2013/0215772 A1* | 8/2013 | Kaur et al. | 370/252 |
| 2014/0235242 A1* | 8/2014 | Granzow et al. | 455/436 |

FOREIGN PATENT DOCUMENTS

| | | |
|---|---|---|
| WO | WO 2004/004381 A1 | 1/2004 |
| WO | WO 2010/002317 A1 | 1/2010 |
| WO | WO 2012/106998 A1 | 8/2012 |

OTHER PUBLICATIONS

English translation of Notice to File a Response Office Action dated Dec. 17, 2014 corresponding to Korean Patent Application No. 10-2013-7029074.

TSG-RAN WG3, "LS on detection of PLMN change and associated actions in the case of Immediate MDT," 3GPP TSG-RAN WG3 Meeting #71, R3-111082, Taipei, Taiwan, Feb. 21-25, 2011, 2 pages.

3GPP TS 32.422 V10.3.0 (Mar. 2011), Technical Specification, 3rd Generation Partnership Project; Technical Specification Group Services and System Aspects; Telecommunication Management; Subscriber and equipment trace; Trace control and configuration management (Release 10), Mar. 2011, 111 pages.

English translation of Notification of Reasons for Refusal dated Nov. 10, 2014 corresponding to Japanese Patent Application No. 2014-502998.

Qualcomm Incorporated, "MDT architecture consideration," 3GPP TSG-RAN WG2 Meeting #69, R2-101516, San Francisco, U.S., Feb. 22-26, 2010, 2 pages.

NTT Docomo, Inc.: "Discussion on user consent for MDT," 3GPP TSG-RAN3#71, R3-110796, Taipei, Taiwan, Feb. 21-25, 2011, 3 pages.

\* cited by examiner

EXCLUDING ROAMING USERS FROM AREA BASED MDT DATA TRANSMISSION

FIELD OF THE INVENTION

The present invention relates to an apparatus, a method, a system, and a computer program product related to minimization of drive tests (MDT). More particularly, the present invention relates to an apparatus, a method, a system, and a computer program product for selection of user equipment (UE) for performing MDT measurements.

BACKGROUND OF THE INVENTION

The present application is in the context of operation and management of a $3^{rd}$ generation partnership (3GPP) network. An area based MDT campaign designates an automatic collection of certain UE measurements and the transmission of the measurement results to the eNB, to enable easier monitoring of network performance and consequently to replace expensive drive tests performed manually by the operator. The UEs performing area based MDT measurements are selected by the eNodeB (eNB). If measurements are not activated in the UE, the eNB may activate them in the UE.

The eNB may select UEs for MDT data collection and transmission that fulfill the MDT selection criteria, which are determined mainly by radio access parameters such as the location of the UE. There is no criterion defined whether roaming users may be participating in the MDT data collection or not. If the terminal of a roaming user is MDT capable it may be automatically selected for an MDT session. Only local regulations may be considered but privacy aspects of the users are not taken into account.

However, for user privacy different regulations may apply to roaming users than for home users. E.g. for a US resident having US subscription roaming in other countries than USA, there may be a need to apply stricter regulations than for local subscribers. Thus, the local operator may unconsciously violate the roaming user's privacy.

However, in case of the present selection criteria for MDT selection such as the location area of the UE, where the UE selection is up to the eNB, the eNB does not know whether a given user is roaming or not.

One prior art solution proposed to indicate whether the user consent for MDT data collection and transmission has been given. However, it does not necessarily mean that the consent given at home network can be equally interpreted in visited network. Regulations on user privacy may differ in different countries and an indication of e.g. one bit received e.g. from a home subscription server (HSS) may be misused. Furthermore, asking for user consent every time before sending MDT configuration message would require involving a chain of CN-RAN interfaces between home PLMN (HPLMN) and visited PLMN (VPLMN), thus it would not be a very desirable solution. In addition, area based MDT usability would be seriously endangered, i.e. so far area based MDT aims to collect statistical data on network performance provided from randomly selected anonymous users, whereas by asking about user consent for every user each time before selection, the operator would have to somehow contact the user to get its "user consent", introduce a lot of additional signalling and actually identify the user settings (violating his state of anonymity).

SUMMARY OF THE INVENTION

It is an object of the present invention to improve the prior art.

According to a first aspect of the invention, there is provided an apparatus, comprising base station means adapted to provide a base station functionality of a visited mobile network; selecting means adapted to select a user equipment, which is operably connected to the base station means, to report a result of a predefined measurement to the apparatus, wherein the selecting means is adapted to select the user equipment only if a roaming information of the user equipment received from a mobility management entity by which mobility of the user equipment is controlled indicates that a user of the user equipment is subscribed to one of one or more predefined mobile networks.

In the apparatus, the predefined mobile networks may comprise the visited mobile network.

In the apparatus, there may be only one predefined mobile network which consists of the visited mobile network.

In the apparatus, the roaming information may comprise a flag indicating that the user is subscribed to one of the predefined mobile networks, and the selecting means may be adapted to select the user depending on the flag.

In the apparatus, the roaming information may comprise an identification of a home mobile network to which the user is subscribed, the apparatus may further comprise comparing means adapted to compare the identification of the home mobile network with respective identifications of each of the predefined mobile networks, and wherein the selecting means may be adapted to select the user equipment only if the comparing means indicates that the identification of the home mobile network matches an identification of one of the predefined mobile networks.

The apparatus may be adapted to receive the roaming information in an initial context setup request message of the mobility management entity.

The apparatus may further comprise activating means adapted to activate the predefined measurement in the selected user equipment.

In the apparatus, the predefined measurement may be a measurement for minimization of drive tests.

According to a second aspect of the invention, there is provided an apparatus, comprising base station processor adapted to provide a base station functionality of a visited mobile network; selecting processor adapted to select a user equipment, which is operably connected to the base station processor, to report a result of a predefined measurement to the apparatus, wherein the selecting processor is adapted to select the user equipment only if a roaming information of the user equipment received from a mobility management entity by which mobility of the user equipment is controlled indicates that a user of the user equipment is subscribed to one of one or more predefined mobile networks.

In the apparatus, the predefined mobile networks may comprise the visited mobile network.

In the apparatus, there may be only one predefined mobile network which consists of the visited mobile network.

In the apparatus, the roaming information may comprise a flag indicating that the user is subscribed to one of the predefined mobile networks, and the selecting processor may be adapted to select the user depending on the flag.

In the apparatus, the roaming information may comprise an identification of a home mobile network to which the user is subscribed, the apparatus may further comprise comparing processor adapted to compare the identification of the home mobile network with respective identifications of each of the predefined mobile networks, and wherein the selecting processor may be adapted to select the user equipment only if the comparing processor indicates that the identification of the home mobile network matches an identification of one of the predefined mobile networks.

The apparatus may be adapted to receive the roaming information in an initial context setup request message of the mobility management entity.

The apparatus may further comprise activating processor adapted to activate the predefined measurement in the selected user equipment.

In the apparatus, the predefined measurement may be a measurement for minimization of drive tests.

According to a third aspect of the invention, there is provided an apparatus, comprising mobility managing means adapted to provide a mobility management entity functionality for a user equipment which is operably connected to a base station of a visited mobile network; roaming information providing means adapted to provide a roaming information of the user equipment to the base station, wherein the roaming information indicates whether or not a user of the user equipment is subscribed to one of one or more predefined mobile networks.

In the apparatus, the predefined mobile networks may comprise the visited mobile network.

In the apparatus, there may be only one predefined mobile network consisting of the visited mobile network.

In the apparatus, the roaming information may comprise an identification of a home mobile network to which the user is subscribed.

The apparatus may further comprise comparing means adapted to compare an identification of a home mobile network to which the user is subscribed with respective identifications of each of the predefined mobile networks, and the roaming information may comprise a flag whose value depends on a result of the comparing by the comparing means.

In the apparatus, the roaming information providing means may be adapted to provide the roaming information in an initial context setup request message of the mobility managing means.

According to a fourth aspect of the invention, there is provided an apparatus, comprising mobility managing processor adapted to provide a mobility management entity functionality for a user equipment which is operably connected to a base station of a visited mobile network; roaming information providing processor adapted to provide a roaming information of the user equipment to the base station, wherein the roaming information indicates whether or not a user of the user equipment is subscribed to one of one or more predefined mobile networks.

In the apparatus, the predefined mobile networks may comprise the visited mobile network.

In the apparatus, there may be only one predefined mobile network consisting of the visited mobile network.

In the apparatus, the roaming information may comprise an identification of a home mobile network to which the user is subscribed.

The apparatus may further comprise comparing processor adapted to compare an identification of a home mobile network to which the user is subscribed with respective identifications of each of the predefined mobile networks, and the roaming information may comprise a flag whose value depends on a result of the comparing by the comparing processor.

In the apparatus, the roaming information providing processor may be adapted to provide the roaming information in an initial context setup request message of the mobility managing processor.

According to a fifth aspect of the invention, there is provided a method, comprising providing a base station functionality of a visited mobile network; selecting a user equipment, which is operably connected to an apparatus performing the method, to report a result of a predefined measurement to the apparatus, wherein the selecting is adapted to select the user equipment only if a roaming information of the user equipment received from a mobility management entity by which mobility of the user equipment is controlled indicates that a user of the user equipment is subscribed to one of one or more predefined mobile networks.

In the method, the predefined mobile networks may comprise the visited mobile network.

In the method, there may be only one predefined mobile network which consists of the visited mobile network.

In the method, the roaming information may comprise a flag indicating that the user is subscribed to one of the predefined mobile networks, and the selecting of the user may depend on the flag.

In the method, the roaming information may comprise an identification of a home mobile network to which the user is subscribed, the method may further comprise comparing the identification of the home mobile network with respective identifications of each of the predefined mobile networks, and the user equipment may be selected only if the comparing indicates that the identification of the home mobile network matches an identification of one of the predefined mobile networks.

The method may further comprise receiving the roaming information in an initial context setup request message of the mobility management entity.

The method may further comprise activating the predefined measurement in the selected user equipment.

In the method, the predefined measurement may be a measurement for minimization of drive tests.

The method may be method of selecting a user equipment.

According to a sixth aspect of the invention, there is provided a method, comprising providing a mobility management entity functionality for a user equipment which is operably connected to a base station of a visited mobile network; providing a roaming information of the user equipment to the base station, wherein the roaming information indicates whether or not a user of the user equipment is subscribed to one of one or more predefined mobile networks.

In the method, the predefined mobile networks may comprise the visited mobile network.

In the method, there may be only one predefined mobile network consisting of the visited mobile network.

In the method, the roaming information may comprise an identification of a home mobile network to which the user is subscribed.

The method may further comprise comparing an identification of a home mobile network to which the user is subscribed with respective identifications of each of the predefined mobile networks, and the roaming information may comprise a flag whose value depends on a result of the comparing.

In the method, the roaming information may be provided in an initial context setup request message.

The method may be a method of providing roaming information.

According to a seventh aspect of the invention, there is provided a computer program product including a program comprising software code portions being arranged, when run on a processor of an apparatus, to perform the method according to any one of the fifth and sixth aspects.

In the computer program product, the computer program product may comprise a computer-readable medium on which the software code portions are stored, and/or the program may be directly loadable into a memory of the processor.

A system may comprise a base station apparatus according to any of the first and second aspects; and a mobility management apparatus according to any of the third and fourth aspects; wherein the mobility management entity of the base station apparatus comprises the mobility management apparatus; the base station of the mobility management apparatus comprises the base station apparatus; and the roaming information received by the base station apparatus is based on the roaming information provided by the mobility management apparatus.

Thus, MDT measurement configuration may be performed only by UEs whose users are subscribed to the visited network or by UEs of roaming users of specific foreign networks only, whereas for the other users, privacy is maintained by omission these users from selection.

In one embodiment, in order to avoid complex inter-operator communication and complex procedures at Operator side to follow different privacy policies, and/or regulatory rules, and/or security aspects, all roaming users are excluded from MDT data collection and transmission.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

Hereinafter, the following designations are used to distinguish different networks:
visited network: the network of the eNB and MME to which a user equipment is connected;
home network: the network to which the user of the user equipment is subscribed; and
predefined networks: the networks, users of which are allowed to participate in an MDT campaign.

In some cases these networks may coincide: In particular, if a user is not roaming, the visited network is his home network.

According to an embodiment of the invention, the subscriber's roaming status known at the MME side is transferred to the eNB. If eNB is aware of the subscriber's roaming status it may determine whether or not a given user may be selected for MDT data collection.

The transfer of the roaming status from MME to eNB may be preferably performed via S1 signalling connection. Therefore, an information element (IE) may be added to the S1 Initial Context Setup Request message. This IE may contain the subscriber roaming status (is it a home subscriber or roaming subscriber). The roaming status may be a flag. In some embodiments, the IE may, in addition or instead of the roaming status, contain an identification of the HPLMN of the subscriber, either for all subscribers or for roaming subscribers only. By providing the identification of the HPLMN to the eNB, MDT data collection may be allowed for roaming subscribers of certain foreign networks, where corresponding agreements between the operators are in place such that privacy, regulatory, and/or security requirements of the users are fulfilled.

In some embodiments, a new interface may be implemented between MME and eNB to transfer the roaming status information and/or the identification of the HPLMN from MME to eNB.

Figure 1:
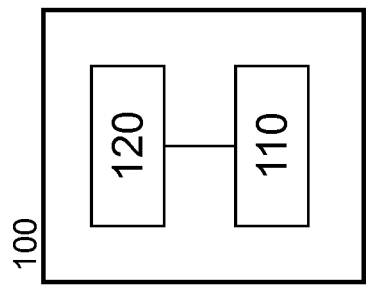
FIG. 1 shows an apparatus according to an embodiment of the present invention.
Figure 4:
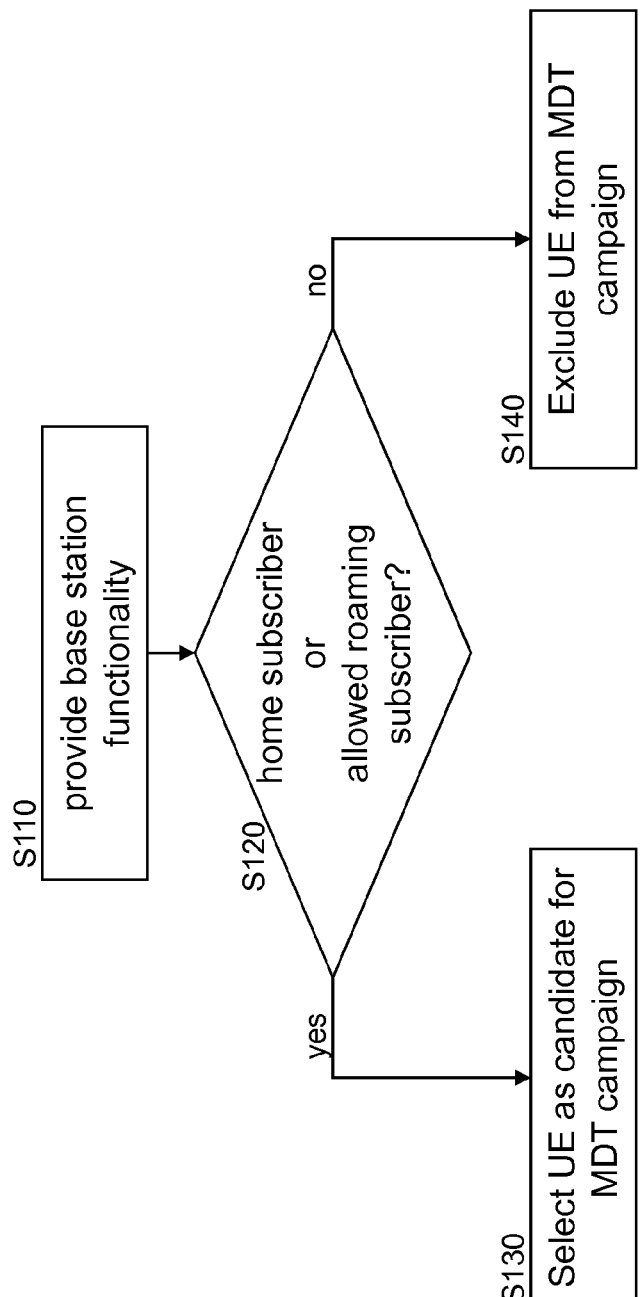
FIG. 4 shows a method according to an embodiment of the present invention.

FIG. 1 shows an apparatus 100 according to an embodiment of the invention. The apparatus 100 may be a base station such as an eNodeB. FIG. 4 shows a method according to an embodiment of the invention. The apparatus according to FIG. 1 may perform the method of FIG. 4 but is not limited to this method. The method of FIG. 4 may be performed by the apparatus of FIG. 1 but is not limited to being performed by this apparatus.

The apparatus 100 comprises a base station means 110 and a selecting means 120.

The base station means 110 is adapted to provide a base station functionality of the mobile network (S110). For example, it may be responsible for the radio connection to UEs in its coverage area. The selecting means 120 is adapted to select a user equipment for an MDT campaign. Here, an MDT campaign means collecting and transmitting of MDT measurements, and it may also comprise activation of MDT measurements in the UE. The selecting means 120 may apply different criteria such as area based criteria and the capability of the UE for MDT measurements. In addition, it checks whether the user is a home user (i.e. subscribed to the network of the base station) or a roaming user subscribed to a network, for which MDT measurements are allowed (S120). If one of these conditions is fulfilled, the UE is a potential candidate for a MDT measurement campaign (S130). The UE will participate in the MDT campaign, if the other criteria such as area criteria are fulfilled, too.

Otherwise, if the user is roaming and subscribed to a foreign network different from the visited network, for which MDT measurement are not allowed, the user is excluded from the MDT measurement campaign (S140).

The selecting means 120 may check the different criteria (e.g. area based criteria, MDT capability, roaming status) in an arbitrary sequence and will select an UE, if all criteria are fulfilled.

Figure 2:
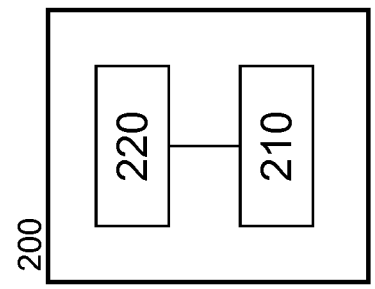
FIG. 2 shows an apparatus according to an embodiment of the present invention.
Figure 5:
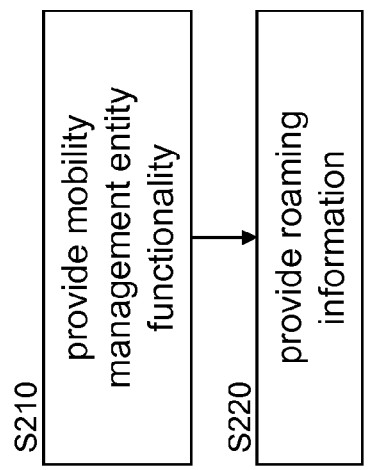
FIG. 5 shows a method according to an embodiment of the present invention.

FIG. 2 shows an apparatus 200 according to an embodiment of the invention. The apparatus 200 may be a mobility management entity such as an MME. FIG. 5 shows a method according to an embodiment of the invention. The apparatus according to FIG. 2 may perform the method of FIG. 5 but is not limited to this method. The method of FIG. 5 may be performed by the apparatus of FIG. 2 but is not limited to being performed by this apparatus.

The apparatus 200 comprises a mobility managing means 210 and a roaming information providing means 220.

The mobility managing means 210 is adapted to provide a mobility management entity functionality of the mobile network (S210). For example, it may be responsible for controlling mobility related aspects of an UE connected to the apparatus 200 (via a base station). Furthermore, it may be responsible for handling the control plane connection of the UE. The roaming information providing means 220 is adapted to provide a roaming status of a UE to a connected eNodeB (S220).

Figure 3:
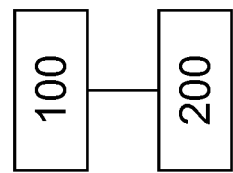
FIG. 3 shows a system according to an embodiment of the present invention.

FIG. 3 shows a system according to an embodiment of the invention. The system comprises a base station apparatus 100 such as the one of FIG. 1 and a mobility management apparatus such as the one of FIG. 2. The mobility management apparatus 200 controls mobility related aspects of UEs connected to the base station apparatus 100. Furthermore, the mobility management apparatus 100 provides a roaming information of the UE to the base station apparatus 200, which the latter may use to select the UE for a MDT campaign or to exclude it therefrom.

According to some embodiments, the roaming information provided by the mobility management apparatus 200 consists of a flag only, which indicates whether or not the UE is allowed to be selected for an MDT campaign. In this case, the mobility management apparatus checks whether the user of the UE is in his home network (subscribed to the visited network, i.e. the network the mobility management apparatus belongs to). If the user is a roaming user and MDT measurements are allowed for users of some predefined networks different from the visited network, too, the mobility management apparatus 200 additionally checks, whether a (roaming) user belongs to one of these predefined networks. For this, it may be checked if an identification of the home network of the user matches to one of the identifications of the predefined networks. In these embodiments, the base station apparatus only needs to evaluate the flag received from the mobility management apparatus.

According to some embodiments, the roaming information of the MME may comprise an identification of the home network of the user. In this case, the eNB may check, whether the user is roaming or belongs to one of the predefined networks for users of which MDT measurements are allowed.

According to some embodiments, the roaming information may comprise a flag indicating whether the subscriber is roaming and in addition an identification of the home network of the user. In some embodiments, the latter may only be provided if the user is a roaming user.

If the check, whether MDT measurements are allowed according to the roaming criterion (i.e. home user or roaming user of a predefined network) is performed in the mobility management apparatus, this check has to be performed frequently (at least with every handover), even if the UE is not considered as a candidate for a MDT campaign at all (e.g. the UE is not in the area of the MDT campaign or not MDT capable). On the other side, managing of the list of predefined networks for which MDT measurements are allowed is simplified.

If the check, whether MDT measurements are allowed according to the roaming criterion is performed in the base station apparatus, it may be performed only when the other criteria (such as area based criteria) for a selection of the UE for an MDT campaign are fulfilled, thus reducing the total processing load on the network. Furthermore, if MDT campaigns are active in several eNB connected to a mobility management apparatus, the processing load is distributed. On the other side, managing of the list of predefined networks for which MDT measurements are allowed is more complex.

Embodiments of the invention are described with respect to a 3GPP Rel-10 network. However, embodiments of the invention may be employed in eNB, MMES, and systems of other 3GPP releases and corresponding entities of other mobile networks such as universal mobile telecommunication system (UMTS), global packet radio system (GPRS); or long term evolution-advanced (LTE-a), if a functionality similar to MDT is implemented. Correspondingly, instead of an eNodeB a corresponding base station of the respective network such as a BTS may be employed in certain embodiments. Instead of a user equipment, another type of terminal such as a smart phone, a mobile phone, a laptop etc. may be employed in some embodiments.

A flag indicating the roaming status may be understood as any information that provides logically binary information whether or not the subscriber is a roaming subscriber. E.g., the flag may comprise one bit or more than one bit.

Matching of the identifications of mobile networks may mean that the identifications are the same. However, in some embodiments, matching may mean that the identification of the subscribed network of the user may be associated unambiguously to an identification of the identifications of the predefined home mobile networks, for which a transmission of MDT data is allowed. E.g., the identifications of the predefined home mobile networks may comprise number ranges or a part of the full identifications of the respective networks only.

Also, in some embodiments, instead of a "white list" check whether the identification of the subscribed mobile network of the user matches to the predefined identifications, a "black list" check may be performed, in which it is checked whether the identification of the subscribed mobile network of the user matches to an identification of a predefined home mobile network for which transmission is excluded. In these embodiments, a UE is only selected, if the identification of the subscribed mobile network does not match any of the predefined identifications.

In some embodiments, MDT measurements may be replaced by other measurements available at the UE where the transmission of the measurement results and, in certain embodiments, the activation of the corresponding measurement should depend on the roaming status of the subscriber. An example of such a measurement may be a location measurement of the UE based on the global positioning system (GPS), which may be forwarded to the eNB only for non-roaming subscribers and for roaming subscribers of specific foreign networks, where the privacy policies, regulatory rules, and/or security aspects allow a transmission of the GPS data to the visited operator.

If not otherwise stated or otherwise made clear from the context, the statement that two entities are different means that they are differently addressed in the mobile network. It does not necessarily mean that they are based on different hardware. That is, each of the entities described in the present description may be based on a different hardware, or some or all of the entities may be based on the same hardware.

According to the above description, it should thus be apparent that exemplary embodiments of the present invention provide, for example a base station, or a component thereof, an apparatus embodying the same, a method for controlling and/or operating the same, and computer program(s) controlling and/or operating the same as well as mediums carrying such computer program(s) and forming computer program product(s). Further exemplary embodiments of the present invention provide, for example a mobility management entity, or a component thereof, an apparatus embodying the same, a method for controlling and/or operating the same, and computer program(s) controlling and/or operating the same as well as mediums carrying such computer program(s) and forming computer program product(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. A base station apparatus, comprising
a base station processor adapted to provide a base station functionality of a mobile network;
a selecting processor adapted to select a user equipment, which is operably connected to the base station processor, from among a plurality of user equipments in order for the selected user equipment to report a result of a predefined measurement to the apparatus,
wherein the selecting processor is adapted to select the user equipment only if a roaming information of the user equipment received from a mobility management entity by which mobility of the user equipment is controlled indicates that a user of the user equipment is subscribed to the mobile network and in the event that the roaming information indicates that a user of the user equipment is not subscribed to the mobile network, the user equipment is excluded from being selected by the selecting processor to report a result of a predefined measurement to the apparatus.

2. Apparatus according to claim 1, wherein
the roaming information comprises a flag indicating that the user is subscribed to one of a plurality of the mobile networks, and
the selecting processor is adapted to select the user depending on the flag.

3. Apparatus according to claim 1, wherein the roaming information comprises an identification of a home mobile network to which the user is subscribed, the apparatus further comprising
a comparing processor adapted to compare the identification of the home mobile network with respective identifications of a plurality of the mobile networks, and wherein
the selecting processor is adapted to select the user equipment only if the comparing means indicates that the identification of the home mobile network matches an identification of one of the mobile networks.

4. Apparatus according to claim 1, adapted to receive the roaming information in an initial context setup request message of the mobility management entity.

5. Apparatus according to claim 1, further comprising
an activating processor adapted to activate the predefined measurement in the selected user equipment.

6. Apparatus according to claim 1, wherein the predefined measurement is a measurement for minimization of drive tests.

7. Apparatus, comprising
a mobility managing processor adapted to provide a mobility management entity functionality for a user equipment which is operably connected to a base station of a mobile network;
a roaming information providing processor adapted to provide a roaming information of the user equipment to the base station, wherein the roaming information indicates whether or not a user of the user equipment is subscribed to the mobile network to enable the base station to select the user equipment from among a plurality of user equipments in order for the selected user equipment to report a result of a redefined measurement to the apparatus only if the roaming information of the user equipment indicates that a user of the user equipment is subscribed to the mobile network and in the event that the roaming information indicates that a user of the user equipment is not subscribed to the mobile network, the user equipment is excluded from being selected to report a result of a predefined measurement.

8. Apparatus according to claim 7, wherein the roaming information comprises an identification of a home mobile network to which the user is subscribed.

9. Apparatus according to claim 7, further comprising
a comparing processor adapted to compare an identification of a home mobile network to which the user is subscribed with respective identifications of a plurality of the mobile networks, and wherein
the roaming information comprises a flag whose value depends on a result of the comparing by the comparing means.

10. Apparatus according to claim 7, wherein the roaming information providing processor is adapted to provide the roaming information in an initial context setup request message of the mobility managing means.

11. Method, comprising
providing a base station functionality of a mobile network;
selecting a user equipment, which is operably connected to an apparatus performing the method, from among a plurality of user equipment in order for the selected user equipment to report a result of a predefined measurement to the apparatus, wherein
the selecting is adapted to select the user equipment only if a roaming information of the user equipment received from a mobility management entity by which mobility of the user equipment is controlled indicates that a user of the user equipment is subscribed to the mobile network and in the event that the roaming information indicates that a user of the user equipment is not subscribed to the mobile network, the user equipment is excluded from being selected by the selecting means to report a result of a predefined measurement to the apparatus.

12. Method according to claim 11, wherein
the roaming information comprises a flag indicating that the user is subscribed to a plurality of the mobile networks, and
the selecting of the user depends on the flag.

13. Method according to claim 11, wherein the roaming information comprises an identification of a home mobile network to which the user is subscribed, the method further comprising
- comparing the identification of the home mobile network with respective identifications of a plurality of the mobile networks, and wherein
- the user equipment is selected only if the comparing indicates that the identification of the home mobile network matches an identification of one of the mobile networks.

14. Method according to claim 11, further comprising
- receiving the roaming information in an initial context setup request message of the mobility management entity.

15. Method according to claim 11, further comprising
- activating the predefined measurement in the selected user equipment.

16. Method, comprising
- providing a mobility management entity functionality for a user equipment which is operably connected to a base station of a visited mobile network;
- providing a roaming information of the user equipment to the base station, wherein the roaming information indicates whether or not a user of the user equipment is subscribed to the mobile network to enable the base station to select the user equipment from among a plurality of user equipments in order for the selected user equipment to report a result of a predefined measurement to the apparatus only if the roaming information of the user equipment indicates that a user of the user equipment is subscribed to the mobile network and in the event that the roaming information indicates that a user of the user equipment is not subscribed to the mobile network, the user equipment is excluded from being selected to report a result of a predefined measurement.

17. Method according to claim 16, wherein the roaming information comprises an identification of a home mobile network to which the user is subscribed.

18. A computer program, embodied on a non-transitory computer readable medium, comprising software code portions being configured, when run on a processor of an apparatus, to perform the method according to claim 11.

* * * * *